US006994886B2

(12) United States Patent
David et al.

(10) Patent No.: US 6,994,886 B2
(45) Date of Patent: Feb. 7, 2006

(54) METHODS FOR CALEFACTION DENSIFICATION OF A POROUS STRUCTURE

(75) Inventors: Patrick David, Saint Cyr sur Loire (FR); Dominique Rovillain, Le Chesnay (FR); Frédéric Malon, Pont de Ruan (FR); Pierre Delhaes, Gradignan (FR); Alain Derre, Bordeaux (FR); Michel Trinquecoste, St Medard en Jalles (FR)

(73) Assignee: Commissariat a L'Energie Atomique, Paris (FR)

( * ) Notice: Subject to any disclaimer, the term of this patent is extended or adjusted under 35 U.S.C. 154(b) by 0 days.

(21) Appl. No.: 10/399,401

(22) PCT Filed: Oct. 29, 2001

(86) PCT No.: PCT/FR01/03355

§ 371 (c)(1),
(2), (4) Date: Apr. 22, 2003

(87) PCT Pub. No.: WO02/36520

PCT Pub. Date: May 10, 2002

(65) Prior Publication Data
US 2004/0022956 A1 Feb. 5, 2004

(30) Foreign Application Priority Data

Oct. 30, 2000 (FR) .................................. 00 13921

(51) Int. Cl.
  *B05D 3/02* (2006.01)
  *B05D 1/18* (2006.01)
(52) U.S. Cl. ..................................... 427/226; 427/228

(58) Field of Classification Search ................ 427/226, 427/227, 228, 229
See application file for complete search history.

(56) References Cited

U.S. PATENT DOCUMENTS 3,663,171 A * 5/1972 Granger .................. 423/445 R (Continued)

FOREIGN PATENT DOCUMENTS

EP        0 515 186        11/1992

(Continued)

OTHER PUBLICATIONS

"Carbon and High Performance Fibres Directory" (D.R. Lovell, 5th Edition, 1991, Chapman & Hall); Cover Page, Table of Contents, and pp. 267-269.

(Continued)

*Primary Examiner*—Michael Cleveland
(74) *Attorney, Agent, or Firm*—Oblon, Spivak, McClelland, Maier & Neustadt, P.C.

(57) ABSTRACT

The invention relates to a film-boiling densification method for a porous structure (mixed gas-liquid method) (5) consisting in immersing of the porous structure into a liquid precursor, a hydrocarbon, for example, and heating the system in order to deposit the decomposition product of said liquid precursor, for example carbon, into the pores of the porous structure, characterized in that the flow of the liquid precursor entering the porous structure is reduced, for example by means of a filter (52) made of polytetrafluoroethylene surrounding the structure so as to reduce the vaporization phenomenon of the liquid precursor around the porous structure to be densified.

12 Claims, 2 Drawing Sheets

U.S. PATENT DOCUMENTS

| | | | |
|---|---|---|---|
| 4,279,952 A * | 7/1981 | Kodama et al. | 428/36.1 |
| 5,348,774 A * | 9/1994 | Golecki et al. | 427/543 |
| 5,389,152 A | 2/1995 | Thurston et al. | |
| 5,547,717 A | 8/1996 | Scaringella et al. | |
| 5,981,002 A * | 11/1999 | Connors, Jr. | 427/591 |

FOREIGN PATENT DOCUMENTS

| | | |
|---|---|---|
| FR | 2 516 914 | 11/1981 |
| FR | 2 712 884 | 6/1995 |
| FR | 2 760 741 | 9/1998 |
| FR | 2 760 742 | 9/1998 |
| WO | 99 40042 | 8/1999 |

OTHER PUBLICATIONS

"Fibrous Materials" (K.K. Chawla, 1988, Cambridge University Press). Cover Page and part of Section 2.2.

"Fiber Reinforced Ceramic Composites" (K.S. Mazdiyasni, 1990, Noyes Publication). Cover Page and pp. 423-424.

"Resin Transfer Moulding" (K. Porter, 1997, Chapman & Hall). Cover Page and part of section 1.2.3.

* cited by examiner

METHODS FOR CALEFACTION DENSIFICATION OF A POROUS STRUCTURE

This application is a National Stage Application of International Application No. PCT/FR01/03355, which was filed on Oct. 29, 2001; and published WO 02/36520 A1 on May 10, 2002 in French.

TECHNICAL FIELD

The object of the present invention is a densification method for a porous structure and, more precisely, it relates to an improvement of said method, which makes possible reducing the electrical power consumed and increasing the densification rate as well as improving the homogeneity of the texture of the product deposited.

It will be recalled that the film-boiling densification method (gas-liquid mixed method) for a porous structure consists in filling the spaces of the porous structure by depositing in same a material identical to or different from that comprising the structure, by thermal decomposition of a liquid precursor.

The invention applies to the densification of a porous material, in particular felts, textiles, needle-punched and three-directional preforms, can be advantageously used because of their high mechanical resistance, their excellent thermal insulating ability, and their good resistance to shock and abrasion, for producing thermal shielding, brake disks and nozzle throats.

STATE OF THE PRIOR ART

The basic technique of the film-boiling densification method or rapid densification is described in particular in the FR-A-2 516 914 document [1]. This technique consists in immersing the porous structure to be densified into a liquid precursor comprised of a hydrocarbon and heating it by induction so as to form, by decomposition of the hydrocarbon, carbon or pyrolytic graphite capable of depositing on the inside of the pores of the structure.

This technique has also been used, as described in FR-A-2 712 884 [2], for densifying a porous structure using a ceramic material such as boron nitride, by using as the precursor a liquid precursor chosen from the borazines such as trichloroborazine, for example.

Using this technique, two different materials can be deposited in the pores of a porous structure by creating a composition gradient of the two materials inside the structure as is disclosed in EP-A-0 515 186 [3].

Perfections of the device used for this film-boiling densification technique have also been described in U.S. Pat. No. 5,389,152 [4] and in U.S. Pat. No. 5,547,717 [5].

Documents FR-A-2 760 741 [6] and FR-A-2 760 742 [7] propose using other liquid precursors such as cyclohexane; these precursors are aromatic compounds comprised of halogen or alkyl derivatives of benzene and naphthalene. These documents also proposed maintaining another porous structure of a thickness of at least equal to 3 mm in contact with the structure to be densified in order to assure densification of the porous structure over its entire thickness.

In the methods described in the documents cited above, the material flows are governed by the film-boiling phenomenon and is carried out in a natural fashion, which results in:

poor energy yield, since 50 to 90% of the heating energy passes into evaporation without being used in the cracking operation, and non-optimized densification rates, since the thermal gradients are very high and the densification rate diminishes as the thermal gradient increases.

SPECIFICATION OF THE INVENTION

The object of the present invention is precisely an improvement of the film-boiling densification methods for porous structures, which makes possible reducing the electrical power consumed and increasing the densification rate as well as improving the homogeneity of the texture of the deposited product in the case where it is carbon.

According to the invention, the film-boiling densification process for a porous structure consists in immersing the porous structure, whether joined or not to a susceptor, in a liquid precursor and heating the system in order to deposit the decomposition product of said liquid precursor in the pores of the porous structure, and it is characterized in that the flow or the liquid precursor entering the porous structure is reduced so as to reduce the vaporization phenomenon of the liquid precursor around the porous structure to be densified. Heating can be of the resistive or the inductive type (with or without a susceptor, by direct coupling to the preform).

The invention thus consists in controlling the arrival of the liquid precursor in the porous part to be densified. This can be obtained by disposing around at least one part of the porous structure a filter made of a material different from that forming the structure, having a permeability of less than that of the structure to be densified. For example, a filter having a permeability of 0.05 to 20 D and a thickness of 50 $\mu$m to 2 mm can be used.

By virtue of the presence of this filter around the porous structure, for a maximal temperature identical in the part there is a reduction of the electrical energy and an increase in the densification rate.

The reduction of the electrical energy is principally due to the fact that the vaporization of the precursor, which is a very endothermic phenomenon, absorbing energy and cooling the exterior of the porous structure, is greatly reduced in terms of flow.

The increase of the densification rate is a consequence of the aforesaid phenomenon. It emerges from the fact that the thermal gradients are weaker in the part, because the amount of heat removed is less and the deposition rate intersects exponentially with temperature, which produces a globally more rapid rate of densification.

Finally, in the case, wherein the method of the invention is used for densifying a porous structure by carbon deposition, the filter also improves, for the range of temperatures least elevated, homogeneity of the carbon deposited. It makes possible elimination of the formation of mosaic or ex-pitch type carbon at the interior of the strands or mesh of fibers of the porous structure, while attenuating or mollifying the perturbations due to boiling of the precursor, or the surge penetration of the liquid into the porous structure.

Thus, according to the invention, these results are achieved by reducing the flow of liquid precursor entering into the porous structure which is the opposite of the object pursued by the document [4], wherein, in contrast, the object is to increase the flow of precursor into the structure by the creation of liquid waves, rather than limiting them.

Likewise, the effect obtained by virtue of the presence of a filter is quite different from that which is obtained with the felt used in documents [6] and [7].

In these documents, the felt acts as an extension of the porous structure and is partially densified at the start of the process. Thus, densification of the porous structure over its entire thickness is assured.

According to the invention, the filter does not act as an extension of the porous structure, but as a limiter of the entry flow of liquid precursor into the porous structure.

The filter used in the invention can be made of various materials under the condition that the material used is inert with respect to the liquid precursor used and that it withstands the boiling temperature of the liquid precursor.

This filter can be made of mineral fibers, organic fibers or of glass fibers (for example in the form of one or a plurality of layers of fabrics).

The material used for the filter is also chosen as a function of the nature of the liquid precursor used, so that it has a suitable wettability by the liquid precursor.

According to the invention, a filter comprised of a polytetrafluorethylene fabric can be used advantageously.

The thickness of the filter is also chosen as a function of the nature of the liquid precursor used for obtaining the flow reduction of the appropriate precursor. The choice of the thickness also allows modulating the power and rate of deposition in the porous structure. However, beyond a certain filter thickness, densification results in increasing porosity, which generally impairs, for the most current applications, the quality of the densified material.

According to the invention, the same reduction in liquid precursor flow effect introduced into the part could be obtained, by depositing around it, in the reactor, a diffusion barrier comprised of fittings (glass beads, Raschig rings).

The method of the invention can be implemented for depositing various products, in particular carbon or ceramic compounds or mixtures thereof.

In the case, wherein the porous structure is densified by carbon deposit, the liquid precursor can be a liquid hydrocarbon chosen from alkanes, cycloalkanes, alkenes, aromatic hydrocarbons and their derivatives.

The cycloalkane, in particular, can be cyclohexane.

The aromatic hydrocarbons can be chosen from benzene, naphthalene and their halogenated or alkylated derivatives.

In the case of deposition of a ceramic compound, the liquid precursor can be chosen from borazines, alcoholates, silanes and their derivatives.

According to the invention, another porous structure of a thickness of at least equal to 3 mm, such as a felt having a thickness of 3 to 10 mm, can be intercalated between the porous structure to be densified and the filter.

In order to implement the method of the invention, the system can be heated by induction, by Joule effect or by direct coupling or by a combination of these means.

When the heating is an inductive heating implemented with a susceptor or a resistive heating implemented using a resistor, an expansion joint is preferably disposed between the porous structure to be densified and the susceptor or the resistor.

Such a joint generally has a thickness of at least 1 mm, advantageously at least 3 mm. It can be made of paper or graphite.

The porous structures capable of being densified by the method according to the invention, can be in particular textiles or felts of carbon or graphite.

Generally, densification is carried out on such porous structures by depositing carbon, starting with the aforementioned liquid precursors.

Other features and advantages of the invention will become obvious when reading the following description, the illustrative non-limiting exemplary embodiment, with reference to the appended drawings.

DETAILED DESCRIPTION OF THE EMBODIMENTS

Figure 1:
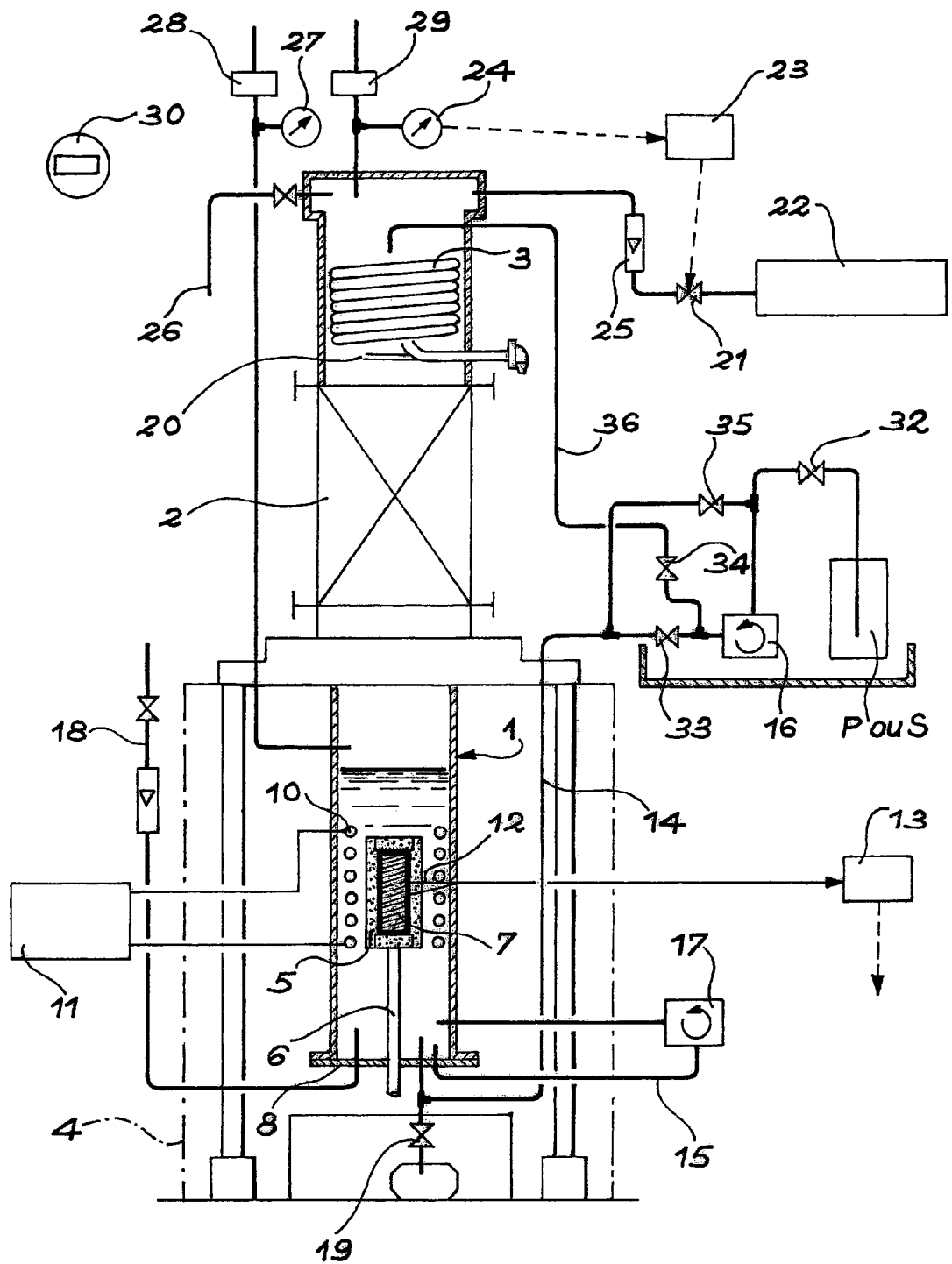
FIG. 1 is a diagrammatic representation of a densification device that can be utilized in the invention

FIG. 1 represents a densification device using induction heating with a susceptor, which can be used for implementing the method of the invention.

This device comprises a column comprised of three parts: a reactor 1, a droplet separator 2 or aerosol trap and a heat condenser or exchanger 3. The reactor section is equipped with a confinement enclosure or glove box 4, sweep internally by a neutral gas current. This assures the safety of the operator in the event of rupture of the reactor and makes it possible to prevent inflammation or explosion of the reaction gas as well as inhalation of the product by the operator.

The system comprising the porous structure to be densified 5 and the susceptor 7 is placed on a support 6, which can be rotary or not. The support 6 is mounted in the bottom part of the reactor 1 and passes the closure lid 8 across which it can slide.

The induction coils 10, which can be arranged inside of the reactor, are supplied with high-frequency power by a generator 11. The temperatures of the porous structure and of the susceptor are measured by thermocouples or thermosensors 12, connected to a programmer 13, making it possible to regulate the power of the generator 11, in order to control the deposit temperature.

Furthermore, the reactor comprises a conduit 14 that enables introduction of the precursor continuously to the inside of the reactor 1 and a conduit 15 that enables continuous filtering of the reactor contents, in order to eliminate tars and suspensions generated in it; these two conduits are each equipped with a circulation pump 16 and 17. The reactor is also equipped with a nitrogen conduit 18 or other neutral gas used to expunge the air contained in the reactor 1 at the start of the process and, finally, an opening equipped with a valve 19 disposed in the bottom part of the reactor and allowing evacuation of same.

The droplet separator 2, arranged above the reactor 1, acts to eliminate the mist created in the reactor 1. The condenser or heat exchanger 3, arranged above the droplet separator 2, comprises a serpentine 20 for circulation of cooling liquid (generally water).

The heat exchanger makes it possible, by cooling the vapors of the precursor and by condensing them, to send them back to the reactor 1.

The reaction gases are extracted under negative pressure by means of a pressure regulating valve 21 and passed through a conduit to a gas treatment installation 22 (neutralization in the event of utilization of halogen compounds). The pressure regulating valve 21 is controlled by a regulator 23 connected to a pressostat 24. The gas flow from cracking is measured by a flow meter 25. The line 26 enables analysis of the gas.

The installation comprises also a second pressostat 27, in order to identify the pressure inside the reactor as well as two conduits equipped with safety release valves 28 and 29, in order to avoid an overpressure in the column (calibrated at 0.2 MPa). An explosimeter 30 is also positioned in proximity to the installation for detecting any cracking gas leakage to the outside of same.

The valves 32, 33, 34 and 35 make possible the use of the pump 16, either for sending precursor P during the implementation of the method or for circulating solvent S in closed circuit through the conduits 14 and 36 for cleaning the installation at the end of experimentation.

Figure 2:
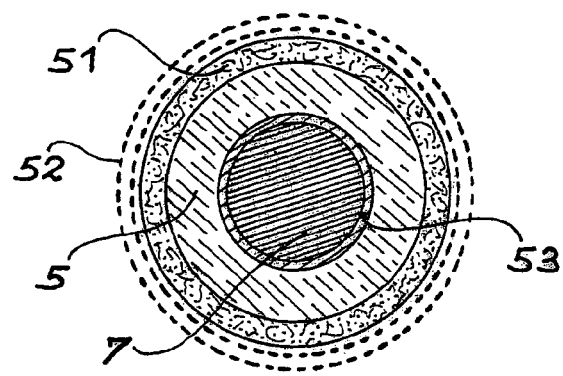
FIG. 2 represents the porous structure to be densified in horizontal cross-section

FIG. 2 represents a horizontal cross-section of the system formed by the porous structure 5 and the susceptor of FIG. 1 surrounded by payex (graphite paper) 53.

In this figure, it can be seen that the porous structure 5 is disposed around the susceptor 7 and that it is surrounded by a felt 51 and the filter 52 according to the invention.

It will be noted that in this figure, the thickness of the filter has been exaggerated with respect to that of the felt, since the filter has a substantially lesser thickness.

In the following, an mode of implementation of the method of the invention in this device is described.

The system comprised of the susceptor 7, the porous structure 5, the felt 51 and the filter 52 are arranged on the support 6 on the outside of the reactor 1. The thermosensors 12 are positioned, then the reactor 1 and the confinement chamber 4 are purged using an inert gas in order to sweep out any oxygen that may be present. Then the reactor is filled with a precursor, cyclohexane for example.

After having put the cooling circuit 20 and the gas treatment installation 22 into operation, and powering up the filtration pump 17, the generator 11, the temperature programmer 13, the pressure regulator 23, temperature increase of the system is started. The pressure is set to 0.12 MPa with the aid of the pressure regulator 23.

Once the precursor starts to boil, inert gas purging of the reactor is suppressed. When the cracking temperature (around 800° C. for cyclohexane) is reached, the precursor vapor decomposes in the porous structure, which results in deposition of carbon on the inside of the pores of the substrate.

More precisely, cracking is done at the level of the hottest walls of the porous structure. When the porous structure is mounted on a susceptor, the densification front propagates from the face of the porous structure in contact with the susceptor towards the exterior wall. When there is no susceptor, the densification front progresses from the interior of the porous structure towards its exterior walls placed in contact with the liquid precursor.

The rate of advance of the densification front can vary by several tenths of a mm/h to cm/hr as a function of the maximal temperature of the porous structure and its nature (type of porosity). The temperature is controlled by the programmer 13 connected to the thermocouple 12 placed in the susceptor 7 (or at the center of the porous structure 10, when there is no susceptor). The measurement by the flow meter 25 of the reaction gas flows and the identification of their composition enables calculation of the rate of advance of the densification front.

Continuous addition of precursor is done in order to conserve a constant quantity of precursor in the reactor.

The reaction gas mixture, non-cracked vapor and aerosols produced in the reactor is evacuated in the upper part of same. The aerosols and the vapors are condensed in the droplet separator 2 and the exchanger 3; the reaction gases are extracted in the upper part of the installation and eventually neutralized in the gas treatment installation 22. At the end of densification, the measured gas flow drops significantly. The temperature is then reduced progressively until reaching ambient temperature.

The system thus obtained is then recuperated and subjected to thermal treatment at approximately 500° C. in the furnace under vacuum, in order to remove the residual precursor impregnating the remaining porosities. The susceptor and the filter are separated from the system and the external part of the structure not densified (the added felt, if there was one) is machined.

In the case of a carbon deposit, the densified structures obtained are homogeneous, of a density greater than or equal to 1.7 and have, as demonstrated by optical microscopic characterization in polarized light, a coarse laminar structure. This structure is most interesting, because it allows obtaining, by high temperature (2,400° C.) thermal treatment, a crystalline structure approximating that of graphite.

In the following, two examples of carbon densification of parts are described, by using cyclohexane as the liquid precursor and by giving the results at the time of densification with or without a filter.

EXAMPLE 1

The reactor used has an inside diameter of 200 mm, an height of 300 mm. The inductor that is arranged inside the reactor, has a height of 150 mm and is comprised of six turns having inside and outside diameters having values of 175 mm and 195 mm, respectively.

The susceptor used has a diameter of 80 mm and a height of 100 mm. It is entirely covered using three pieces of carbon felt (density 0.40 to 0.45) to be densified:
  a hollow cylinder having inside and outside diameters, respectively, of 80 and 120 mm and a height of 100 mm, covering its lateral surface;
  two disks having a diameter of 120 mm and a thickness of 20 mm covering the top and bottom parts of the two flat surfaces.

The system is covered with a filter formed of two layers of polytetrafluorethlylene GORE-TEX®, having the following characteristics:
  thickness of one layer: 0.2 mm;
  filtration: allows passage only of particles of a diameter less than 7.5 $\mu$m;
  permeability: 1 Darcy (or 1 $\mu m^2$);
  thermal conductivity: 0.045 W/m.K at 50° C.; 0.054 W/m.K at 100° C.

The total thickness of the filter is 0.4 mm.

Pressure is set at 0.1 MPa. The temperature increase is done at a rate of 500° C./h up to 1,100° C. Power is adjusted over time so as to keep the cracking gas flow almost constant. After approximately 7 h of densification, the temperature is reduced at a rate of 800° C./h.

The results are as follows:
  the densification rate is 3 mm/h;
  energy consumption is 65 kWh/kg of carbon deposited;
  the carbon is deposited homogeneously and has a coarse laminar type structure;

By comparison, without GORE-TEX® filter under the same conditions, densification takes about 10 h:
  the densification rate is 1.9 mm/h;
  energy consumption is 120 KWh/kg;

deposit is not homogeneous, since in the fiber strands, in part externally, there are mosaic type carbon or ex-pitch carbon deposits.

EXAMPLE 2

This example relates to the densification of small pieces of carbon. Heating is done resistively.

The heating element is a bar of graphite 3 mm in diameter. It is surrounded by the sample to be densified, which is a tube of carbon felt (density 0.1) 2 cm in diameter and 3 cm in height. The system is enveloped in a filter formed of two layers of GORE-TEX® tissue, as in Example 1.

The pressure is set at 0.1 MPa. The temperature increase is done at a rate of 1,000° C./h up to 1,100° C. The temperature is held at 1,100° C. for 30 minutes, then lowered at a rate of 1,000° C./h.

The results are as follows:
the rate of densification is 4 mm/h;
the energy consumed is 110 kWh/kg of carbon deposited;
the density is 1.8.

By comparison, if there were no GORE-TEX® filter, under the same conditions:
the rate of densification is 0.6 mm/h;
the energy consumed is 1,400 kWh/kg of carbon deposited;
the density is 1.8.

Figure 3:
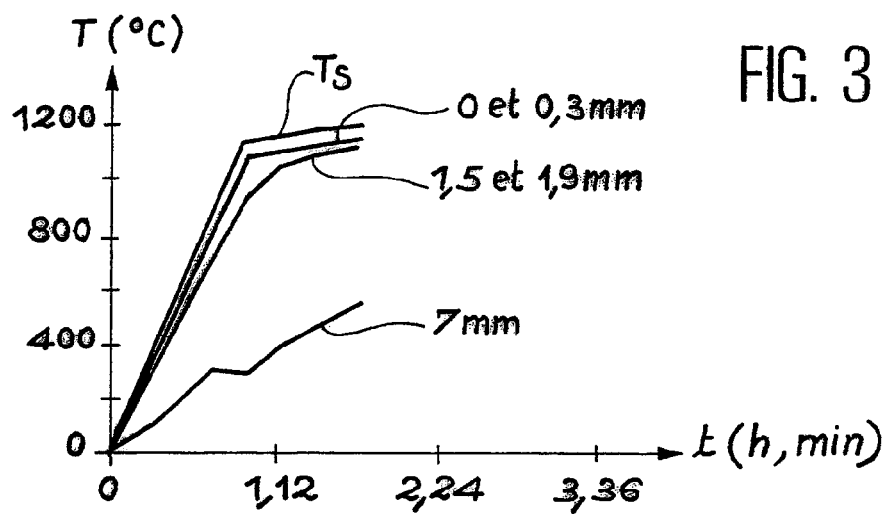
FIG. 3 represents the temperature profiles in the porous structures in the form of disks subjected to densification in the presence of a filter
Figure 4:
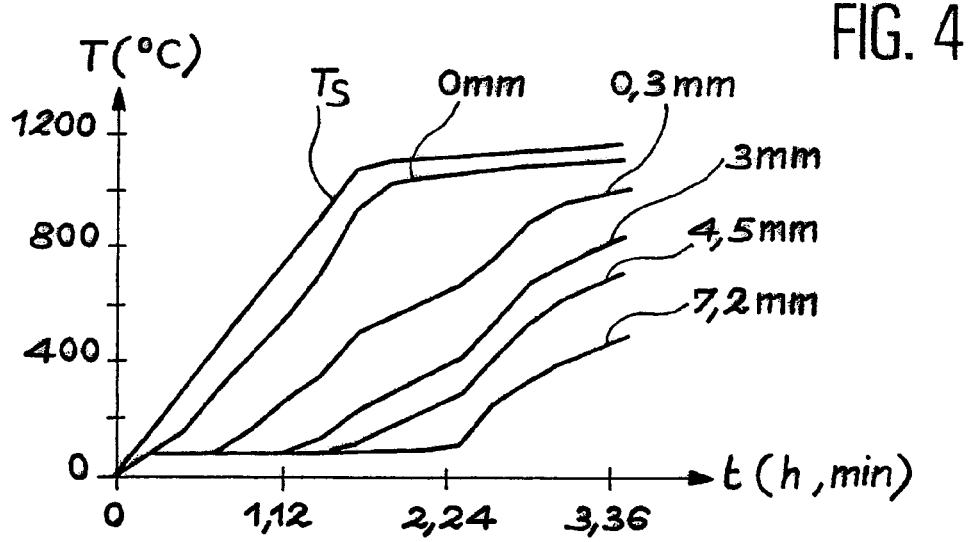
FIG. 4 represents the temperature profiles in the porous structures, identical to those used for FIG. 3, but densified in the absence of a filter.

FIGS. 3 and 4 represent the temperature profiles in the 20 mm carbon disks densified in Example 1.

In FIG. 3, the curve Ts represents the temperature variation (in ° C.) of the susceptor as a function of time (in hours and in minutes). The following curves indicate the evolution of the temperature (in ° C.) as a function of time (in hours and in minutes) for the regions of the disk situated at the distances indicated (in mm). Each distance corresponds to the distance between the place on the part, where the temperature is measured and the susceptor.

FIG. 4 represents the temperature profiles obtained under the same conditions on 20 mm thick disks, in the absence of a GORE-TEX® filter.

By comparing these two figures, it is noted that the most rapid increase in FIG. 3, whose that the thermal gradients are lower. As the rates of deposit on the fibers and the carbon yields converge with temperature, the highest temperature values in the part, that is a lower gradient in the case wherein a GORE-TEX® filter is used, result in more rapid densification, lower energy consumption and a higher yield in carbon.

It is thus confirmed that the use of a filter according to the invention controls the liquid/gas interface and simply changes the vapor flux on the inside of the parts, which makes possible significant gains relative to the densification rate and the electrical energy required for densification, important economic factors in manufacturing the parts.

DOCUMENTS CITED

[1] FR-A 2 516 914
[2] FR-A-2 712 884
[3] EP-A-0 515 186
[4] U.S. Pat. No. 5,389,152
[5] U.S. Pat. No. 5,547,717
[6] FR-A-2 760 741
[7] FR-A-2 760 743

What is claimed is:

1. A method for film-boiling densifying a porous structure, comprising:
   a) depositing, around at least one part of the porous structure, a filter made of a material different from that forming the porous structure said material being a textile of mineral or organic fibers and said filter having a permeability lower than that of the porous structure;
   b) immersing the porous structure with the so-deposited filter in a liquid precursor which decomposes under heat;
   c) heating the porous structure with the so-deposited filter in the liquid precursor to decompose the liquid precursor and to deposit the decomposition product of said liquid precursor into the pores of the porous structure, until the porous structure is densified,
   wherein a flow rate of the liquid precursor into the porous structure in the presence of the so-deposited filter is less than a flow rate of the liquid precursor into the porous structure in the absence of the so-deposited filter.

2. The method according to claim 1, wherein the filter has a permeability of 0.05 to 20 Darcy and a thickness of 50 $\mu$m to 2 mm.

3. The method according to claim 1, wherein the filter is a polytetrafluorethylene textile.

4. The method according to claim 3, wherein the filter has a permeability of 1 Darcy and a thickness of 0.2 mm.

5. The method according to claim 1, wherein another porous structure of a thickness at least equal to 3 mm is intercalated between the porous structure to be densified and the filter.

6. The method according to claim 1, wherein the liquid precursor is a liquid hydrocarbon chosen from alkanes, cycloalkanes, alkenes, aromatic hydrocarbons and their derivatives.

7. The method according to claim 6, wherein the liquid precursor is cyclohexane.

8. The method according to claim 6, wherein the liquid precursor is an aromatic hydrocarbon chosen from benzene, naphthalene and their halogenated or alkylated derivatives.

9. The method according to claim 1, wherein the liquid precursor is a precursor of a ceramic compound chosen from borazines, alcoholates, silanes and their derivatives.

10. The method according to claim 1, wherein the heating of the system is a heating by induction using a susceptor and/or a resistive heating by Joule effect and/or a heating by induction by direct coupling.

11. The method according to claim 10, wherein the heating is an inductive heating implemented using a susceptor or a resistive heating implemented using a resistor; an expansion joint being disposed between said porous structure to be densified and said susceptor or said resistor.

12. The method according to any one of claim 1, wherein the porous structure is made of carbon and the liquid precursor is cyclohexane.

* * * * *